United States Patent
Gopal et al.

(10) Patent No.: US 8,391,475 B2
(45) Date of Patent: Mar. 5, 2013

(54) METHOD AND APPARATUS FOR ADVANCED ENCRYPTION STANDARD (AES) BLOCK CIPHER

(75) Inventors: Vinodh Gopal, Westboro, MA (US);
Erdinc Ozturk, Worcester, MA (US);
Gilbert Wolrich, Framingham, MA (US); Wajdi K. Feghali, Boston, MA (US); Kirk S. Yap, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 705 days.

(21) Appl. No.: 11/731,158

(22) Filed: Mar. 30, 2007

(65) Prior Publication Data

US 2008/0240421 A1    Oct. 2, 2008

(51) Int. Cl.
*H04K 1/00*   (2006.01)
(52) U.S. Cl. .................. 380/28; 380/46; 380/37
(58) Field of Classification Search ........... 380/28, 380/37, 46
See application file for complete search history.

(56) References Cited

U.S. PATENT DOCUMENTS

| 2003/0099352 A1* | 5/2003 | Lu et al. ............. 380/37 |
|---|---|---|
| 2003/0108195 A1 | 6/2003 | Okada et al. |
| 2005/0058285 A1 | 3/2005 | Stein et al. |
| 2005/0147239 A1 | 7/2005 | Chin et al. |
| 2007/0237324 A1 | 10/2007 | Ferguson et al. |
| 2008/0130881 A1* | 6/2008 | You et al. ............. 380/46 |

FOREIGN PATENT DOCUMENTS

WO    2008/121734 A1    10/2008

OTHER PUBLICATIONS

Karri et al.(2004), Fault-based Side-channel cryptanalysis tolerant Rijndael symmetric block cipher.*
Tseng (Integrated Design of AES, 2002).*
Tionteck, T. et. al. (2004). Design of a reconfigurable aes encryption/decryption engine for mobile terminals. IEEE Proceedings of the 2004 International Symposium on Circuits and Systems.*
International Search Report/Written Opinion for Patent Application No. PCT/US2008/058505, mailed Aug. 29, 2008, 10 Pages.
International Preliminary Report on Patentability for Patent Application No. PCT/US2008/058505, mailed Oct. 15, 2009, 6 pages.

* cited by examiner

*Primary Examiner* — Ashok Patel
*Assistant Examiner* — Brian Shaw
(74) *Attorney, Agent, or Firm* — Blakely, Sokoloff, Taylor & Zafman LLP (57) ABSTRACT

The speed at which encrypt and decrypt operations may be performed in a general purpose processor is increased by providing a separate encrypt data path and decrypt data path. With separate data paths, each of the data paths may be individually optimized in order to reduce delays in a critical path. In addition, delays may be hidden in a non-critical last round.

13 Claims, 5 Drawing Sheets

METHOD AND APPARATUS FOR ADVANCED ENCRYPTION STANDARD (AES) BLOCK CIPHER

FIELD

This disclosure relates to cryptographic algorithms and in particular to the advanced encryption standard (AES) algorithm.

BACKGROUND

Cryptology is a tool that relies on an algorithm and a key to protect information. The algorithm is a complex mathematical algorithm and the key is a string of bits. There are two basic types of cryptology systems: secret key systems and public key systems. A secret key system also referred to as a symmetric system has a single key ("secret key") that is shared by two or more parties. The single key is used to both encrypt and decrypt information.

The Advanced Encryption Standard (AES), published by the National Institute of Standards and Technology (NIST) as Federal Information Processing Standard (FIPS) 197 is a secret key system. AES is a symmetric block cipher that can encrypt and decrypt information.

Encryption (cipher) performs a series of transformations using the secret key (cipher key) to transforms intelligible data referred to as "plaintext" into an unintelligible form referred to as "cipher text". The transformations in the cipher include (1) Adding a round key (value derived from the cipher key) to the state (a two dimensional array of bytes) using a Exclusive OR (XOR) operation; (2) Processing the state using a non-linear byte substitution table (S-Box) (3) Cyclically shifting the last three rows of the state by different offsets; and (4) Taking all of the columns of the state and mixing their data (independently of one another) to produce new columns.

Decryption (inverse cipher) performs a series of transformations using the cipher key to transform the "cipher text" blocks into "plaintext" blocks of the same size. The transformations in the inverse cipher are the inverse of the transformations in the cipher.

The Rijindael algorithm is specified in the AES standard to process data blocks of 128 bits, using cipher keys with lengths of 128, 192 and 256 bits. The different key lengths are typically referred to as AES-128, AES-192 and AES-256.

The AES algorithm transforms the plaintext into cipher text or cipher text into plaintext in 10, 12, or 14 consecutive rounds, with the number of rounds dependent on the length of the key.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

The Advanced Encryption Standard (AES) algorithm is a compute intensive algorithm that is typically performed in software or in a special purpose processor. Thus, encryption is typically only used for encrypting a subset of the information stored in computers, for example, information that may be classified as "top secret". However, there is a need to encrypt more of the information that is stored on computers. For example, if all information stored on a mobile computer was encrypted, this information would be protected in the event that the mobile computer was stolen.

Typically, a series of transformations for both encrypt and decrypt are combined into a single data path. This results in the addition of delays due to the need to determine at various stages whether the operation being performed is encryption or decryption in order to select the appropriate transformation. As the delay is added to the critical path it reduces the speed at which the encrypt/decrypt operations may be performed.

An embodiment of the present invention increases the speed at which encrypt and decrypt round operations may be performed in a general purpose processor by separating the encrypt and decrypt data paths. With the paths separated, each path may be individually optimized to reduce delays. In addition delays may be hidden in the non-critical last round. The last round does not perform the fourth transformation in the cipher, that is, taking all of the columns of the state and mixing their data independently of each other to produce new columns.

Figure 1:
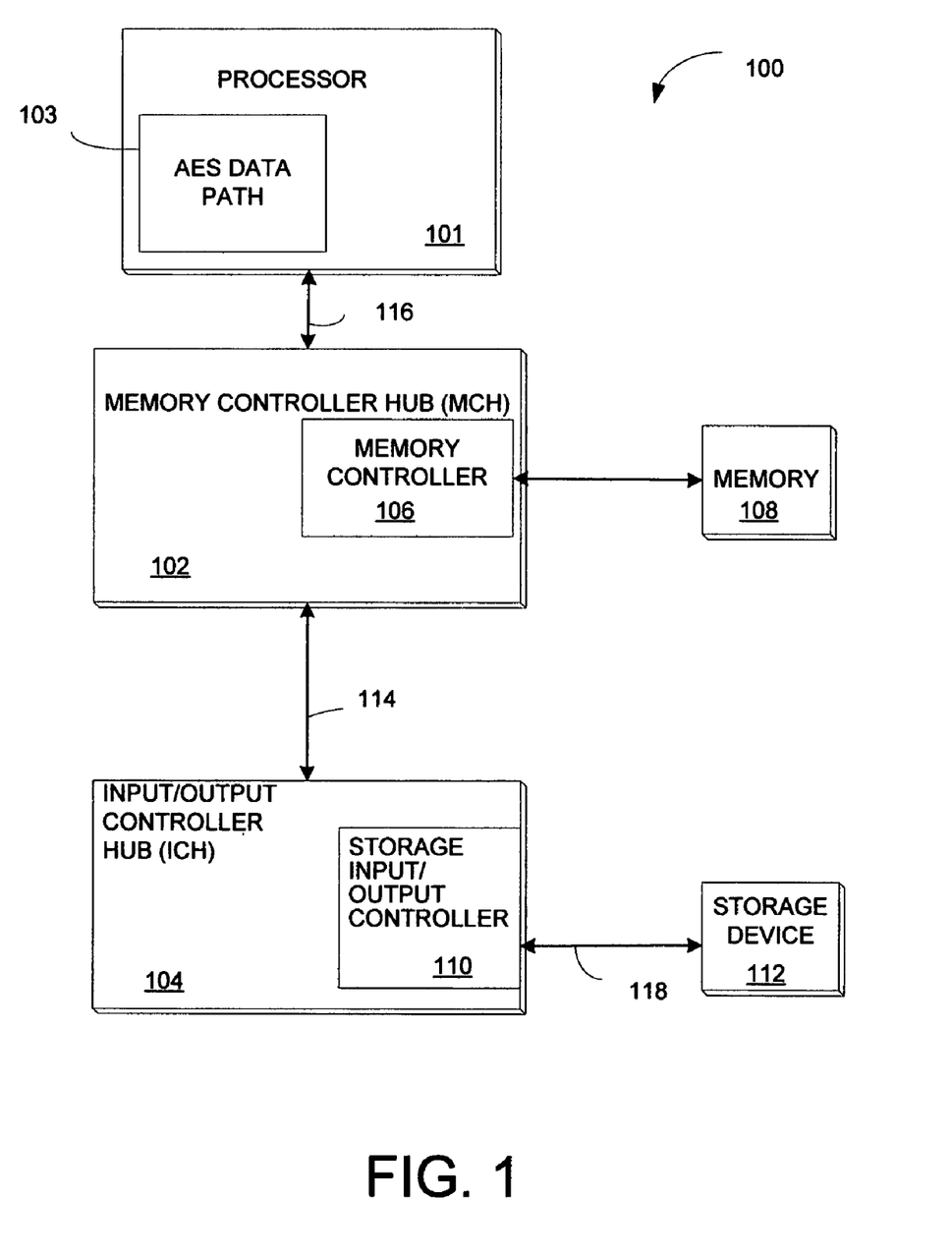
FIG. 1 is a block diagram of a system that includes an aes data path for performing AES encrypt or decryption round operations in a general purpose processor.

FIG. 1 is a block diagram of a system 100 that includes an aes data path 103 for performing AES encrypt or decrypt round operations in a general purpose processor. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 108. The processor 101 and MCH 102 communicate over a system bus 116. The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor. The aes data path 103 in the processor 101 may perform aes encrypt and decrypt round operations on data that may be stored in memory 108 and/or stored in the storage device 112.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 110 for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

Figure 2:
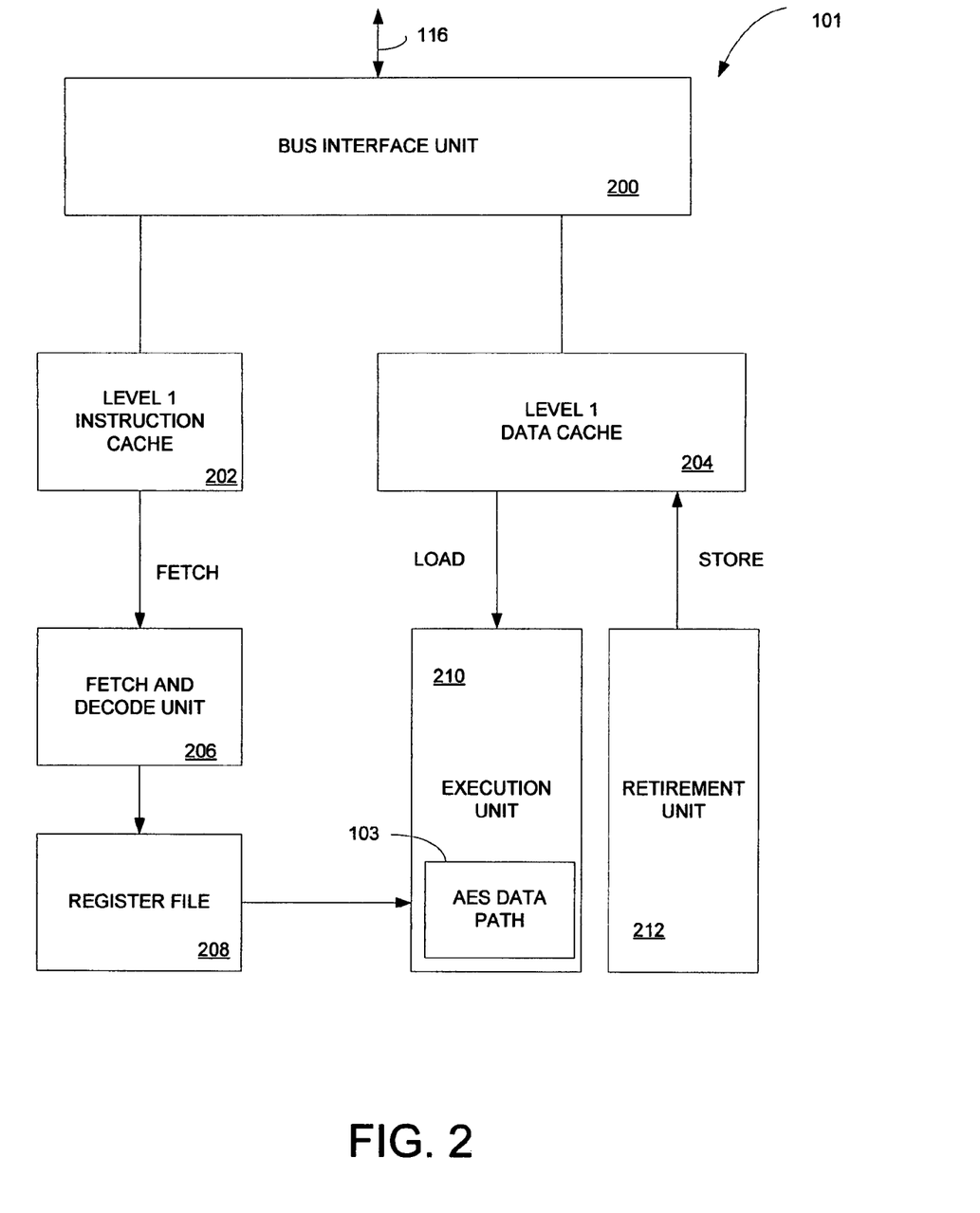
FIG. 2 is a block diagram of an embodiment of the processor shown in FIG. 1.

FIG. 2 is a block diagram of an embodiment of the processor 101 shown in FIG. 1. Processor 101 includes a fetch and decode unit 206 for decoding processor instructions received from Level 1 (L1) instruction cache 202. Data to be used for executing the instruction may be stored in register file 208. In one embodiment, the register file 208 includes a plurality of 128-bit registers, which are used by an aes instruction to store data for use by the aes instruction.

In one embodiment, the register file is a group of 128-bit registers similar to the 128-bit MMX registers provided in Intel Pentium MMX Processors that have a Streaming (Single Instruction Multiple Data (SIMD)) Extension (SSE) Instruction set. In a SIMD processor, data is processed in 128-bit blocks which may be loaded at one time. The 128-bit registers allow instructions to be applied to a 128-bit block (16 bytes) in one operation.

The fetch and decode unit 206 fetches macroinstructions from L1 instruction cache 202, decodes the macroinstructions and breaks them into simple operations called micro operations (μops). The execution unit 210 schedules and executes the micro operations. In the embodiment shown, the aes data path 103 in the execution unit 210 includes micro operations for an aes instruction. The retirement unit 212 writes the results of executed instructions to registers or memory.

Figure 3:
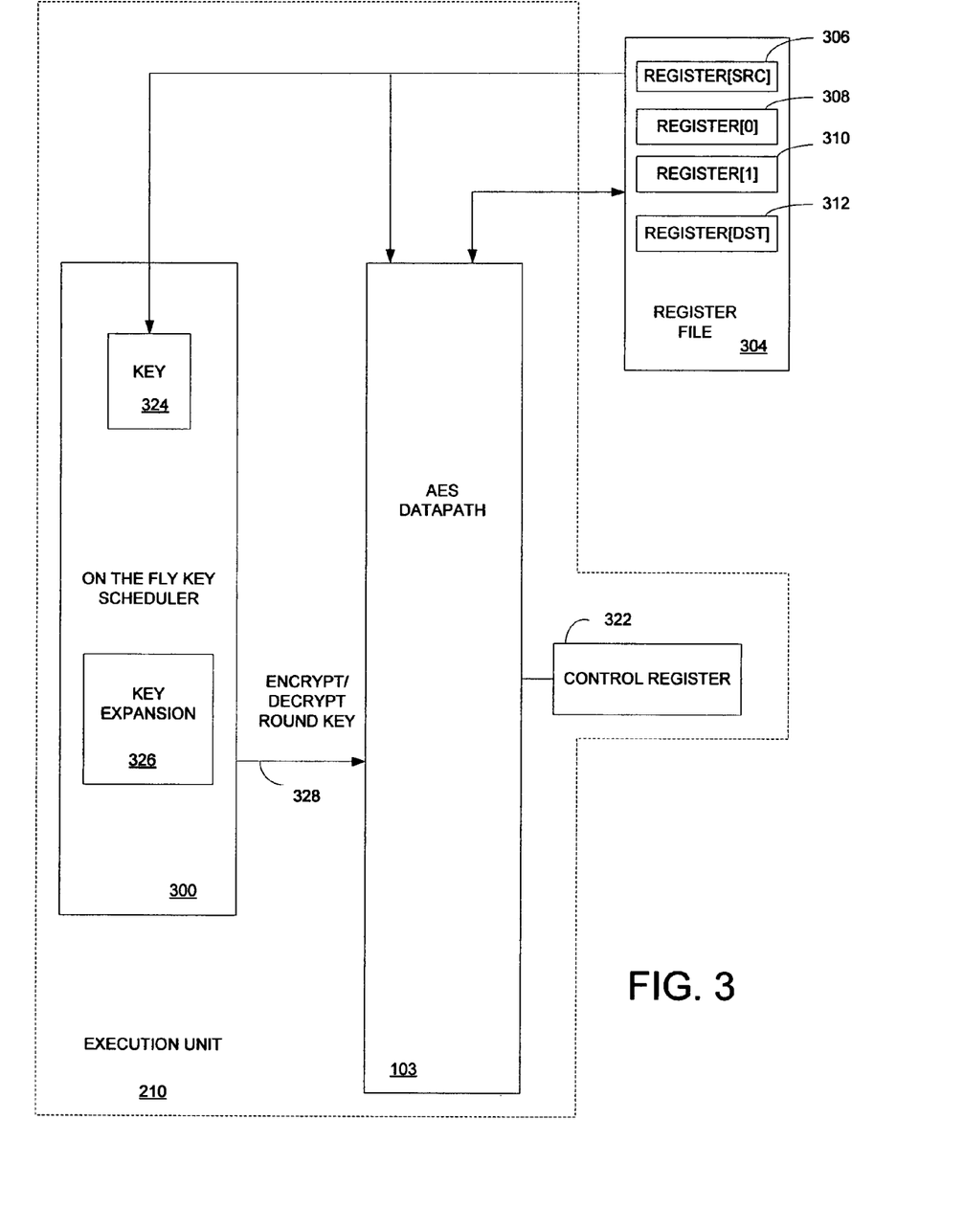
FIG. 3 is a block diagram of a portion of the processor shown in FIG. 1 that includes an embodiment of an execution unit shown in FIG. 2 for performing AES encryption and decryption according to the principles of the present invention.

FIG. 3 is a block diagram of a portion of the processor 101 shown in FIG. 1 that includes an embodiment of an execution unit 210 shown in FIG. 2 for performing AES encrypt and decrypt according to the principles of the present invention.

AES has a fixed block size of 128 bits and a key size of 128, 192 or 256 bits and operates on a 4×4 (16 bytes (128-bit fixed block size)) array of bytes, which is referred to as the 'state'. The AES algorithm transforms a 128-bit plaintext block into a 128-bit block of cipher text (encrypts) or a 128-bit block of cipher text into a 128-bit block of plaintext (decrypts) in 10, 12, or 14 consecutive rounds, with the number of rounds dependent on the key size (128, 192 or 256-bits).

Table 1 below shows an example of the 128-bit result of performing AES encryption using a 128-bit key on a 128-bit block input.

TABLE 1

| | |
|---|---|
| 128-bit Input: | 00112233445566778899aabbccddeeff (Hexadecimal) |
| 128-bit Key: | 000102030405060708090a0b0c0d0e0f (Hexadecimal) |
| 128-bit Result: | 69c4e0d86a7b0430d8cdb78070b4c55a (Hexadecimal) |

In an embodiment, an AES instruction (macro instruction) to perform AES encryption or decryption in the aes data path 103 may be defined symbolically as:
REG[dest]=aes(REG[src],
  key-size={128, 192, 256},
  #rounds={1,10,12,14},
  op={encrypt/decrypt},
  special_last_round={true/false})

Upon decoding the aes instruction, a number of parameters to be used to control the flow in each aes round are stored in a control register 322. The parameters include the size of the key (128-bits, 192-bits or 256-bits), number of rounds (1, 10, 12 or 14), the type of operation (encrypt/decrypt) and whether there is a special last round. AES micro operations perform n rounds of AES accordingly based on the value of n. With a number of rounds value of 10, 12, 14, the aes micro operations may perform the current standard aes for key sizes of 128-bits, 192-bits or 256-bits. By allowing the type of round (last or not last) to be programmable, an AES-like cipher with 20 rounds (with an AES-style last round), or only a "one round" pass may be performed using the same aes instruction and aes micro operations.

When the operation (op) that is selected is encrypt (cipher), the AES data path 103 performs a series of transformations using a secret key (cipher key) to transform intelligible data referred to as "plaintext" into an unintelligible form referred to as "cipher text" as shown above in Table 1. The transformations in the cipher that are performed by the aes data path 103 for each of the rounds (1, 10, 12 or 14) with a round key 328 provided by an on-the-fly key scheduler 300 include: (1) adding a round key (value derived from the cipher key) to the state (a two dimensional array of bytes) using a Exclusive OR (XOR) operation; (2) processing the state using a non-linear byte substitution table (S-Box); (3) cyclically shifting the last three rows of the state by different offsets; and (4) taking all of the columns of the state and mixing their data (independently of one another) to produce new columns. If the "special_last_round" is "true" transformation (4) is not performed for the last round.

The register file 304 has a plurality of 128-bit registers (REG) which may be used by the AES instruction. One of the 128-bit registers REG[src] is designated to store a source operand for the first aes round and another one of the 128-bit registers REG[dst] to store the result of the aes instruction. A 128-bit data block to be encrypted or decrypted by the aes instruction is loaded into a source register 306 in the register file 304 prior to issuing the aes instruction. The source operand is transformed in a number of rounds (1, 10, 12 or 14) to provide the result of the encrypt/decrypt of the 128-bit source data. The source operand may be 128-bits of plaintext to be encrypted using the key or 128-bits of cipher text to be decrypted using the key.

After an aes instruction has been decoded by the fetch and decode unit 206, the execution of the aes instruction by the execution unit 210 involves performing the micro operations associated with the aes instruction. The execution unit 210 retrieves the source operand and the original key that are stored in the register file 304 prior to performing the encrypt or decrypt operation using the micro operations for the aes instruction. In the embodiment shown, the source operand [SRC] (128-bit block state) is stored in register 306 and the 128-bit, 192-bit or 256-bit key is stored in register(s) 308, 310 in the register file 304. In the case of a 128-bit key, the entire 128-bits of the key are stored in one of the 128-bit registers in the register file 304, for example, register 308. For key sizes greater than 128 bits, the most significant bits (greater than 128 bits) are stored in another 128-bit register, for example, register 310. The key size parameter for the aes instruction indicates whether the key is stored in one register or more than one register in the register file 304. The one or more registers in the register file 304 that store the key are not modified during the execution of the aes instruction. In other embodiments other registers in the register file 304 may be used to store the key and the source operand. After the execution of the aes instruction is complete, the result [DST] is stored in register 312 in the register file 304.

In order to reduce the memory required for storing the expanded key (that is, the round keys for each of the 10, 12 or 14 rounds) associated with the key, the execution unit 210 includes an on-the-fly key scheduler 300. Instead of pre-generating the expanded key and storing it in a table, the on-the-fly key scheduler 300 generates the encrypt/decrypt "round key" 328 on-the-fly, that is, as it is needed for the next aes round. The encrypt/decrypt round key 328 is forwarded to the aes datapath 103 for use in the next aes round. The on-the-fly scheduler 300 includes a 256-bit key register 324 to store the original key from which the expanded key is generated. The original key is loaded into the 256-bit key register from one or both registers 308, 310 in the register file 304 dependent on the size of the key (128, 192 or 256).

The key expansion 326 expands the n-bytes of the original key stored in register 304 into b-bytes of an expanded key with the first n-bytes of the expanded key being the original key. For example, for a 128-bit key, the 128-bit key is expanded into a 176-bytes expanded key, that is, 11×16-bytes, with the first 16-bytes being the original 128-bit key, and thus the number of rounds is 10. The 24 bytes of a 192-bit key are expanded into 208 bytes (13×16 bytes) to provide 12 "round keys" one for each of the 12 rounds and the 32 bytes of a 256-bit key are expanded into 240 bytes (15×16 bytes) to provide 14 "round keys" one for each of the 14 rounds.

Figure 4:
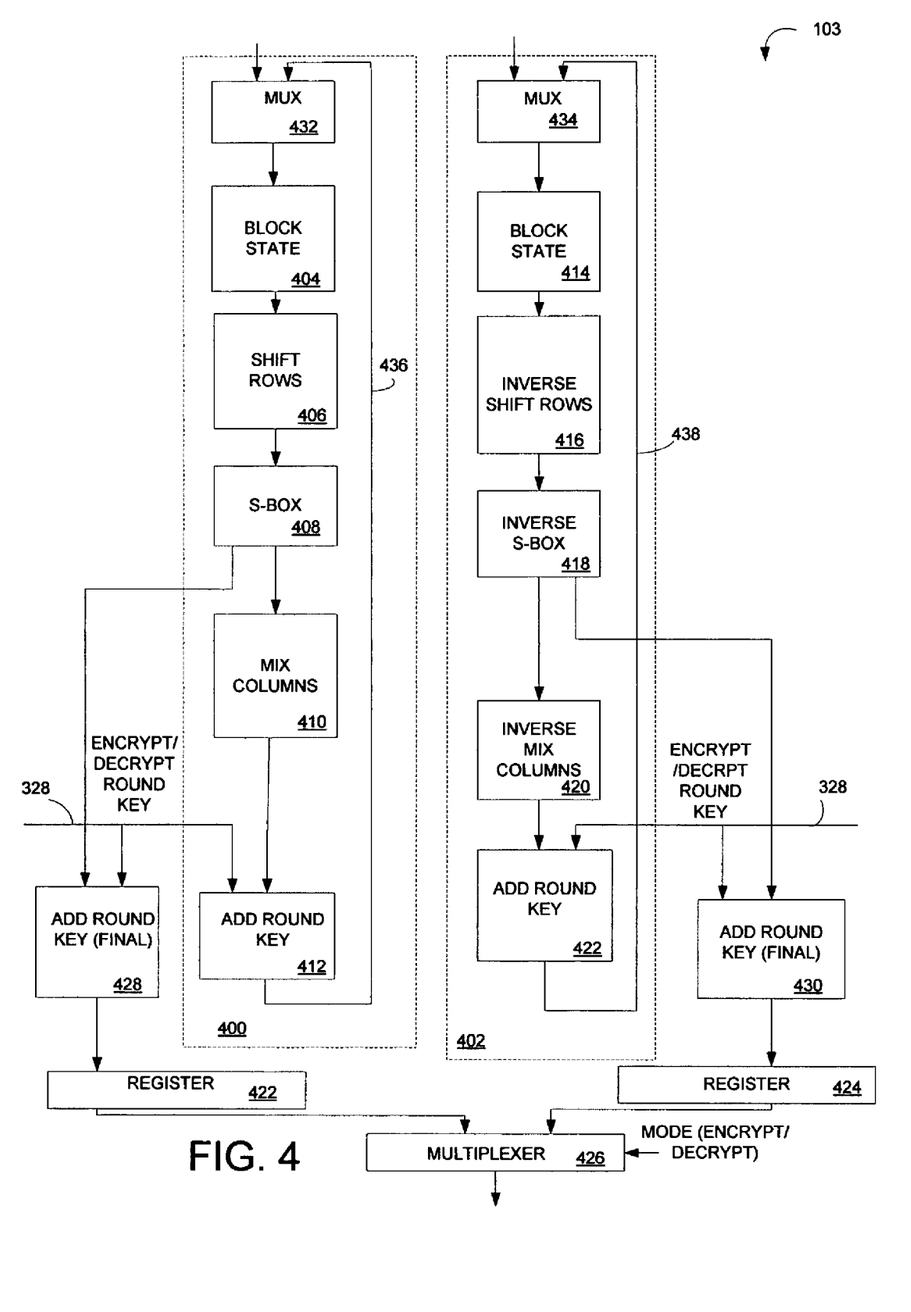
FIG. 4 is a block diagram of an embodiment of the AES data path shown in FIG. 3.

FIG. 4 is a block diagram of an embodiment of the aes data path 103 shown in FIG. 3. The aes data path 103 includes two independent data paths: an encrypt data path 400 and a decrypt data path 402. The encrypt data path (cipher) 400 performs an aes encrypt round and includes micro operations for the following stages: block state 404, SubBytes (S-box) 408, shift rows 406, mix columns 410 and add round key 412. The decrypt data path (inverse cipher) 402 performs an aes decrypt round and includes micro operations for the following stages: Inverse ShiftRows 416, Inverse SubBytes (S-Box) 418, Inverse MixColumns 420 and Add Round Key 422. In another embodiment the round operation sequence for the decrypt data path 402 may reverse the Inverse MixColumns 420 and Add Round Key 422 with the sequence of operations being performed in the following order: Inverse ShiftRows 416, Inverse SubBytes (S-Box) 418, Add Round Key 422 and Inverse Mix Columns 420.

From an architectural visibility, there is exactly one state which is shared across the encrypt data path 400 and the decrypt data path 402. When the initial state is loaded, both block state 404 and block state 414 are loaded with the same value through respective multiplexers 432, 434. The encrypt round key and decrypt round key are registered separately by providing a separate block state 404, 414 for the aes encrypt data path 400 and the aes decrypt data path 402. For example, encrypt round key 436 is directed to block state 404 and decrypt round key 438 is directed to block state 406. After each aes encrypt/decrypt round, each block state 404, 414 is updated with the respective next aes round value from the respective add round key stage 412, 430. However, only one block state value is valid dependent on whether the mode of operation is encrypt or decrypt.

The output of the last encrypt round from the encryption data path 400 is stored in register 422. The output of the last decrypt round from the decrypt data path 402 is stored in register 424. A multiplexer 426 is added after the aes encrypt data path 400 and aes decrypt data path 402 to select whether the output of the last aes round is taken from the aes encrypt data path 400 or the aes decrypt data path 402. Multiplexer 426 allows the result of the last round from the aes encrypt path or the result of the last round from the aes decrypt path 402 to be output as the result of the aes instruction based on whether the mode is encrypt or decrypt.

By separating the aes encrypt data path 400 and the aes decrypt data path 402, additional logic that is used at various stages for selecting whether the aes operation is encrypt or decrypt is not needed. Thus, critical path delay through the aes data path 103 is reduced.

Furthermore, the aes encrypt data path 400 and the aes decrypt data path 402 may be individually optimized. For example, the inverse mix columns 420 in the aes decrypt data path 402 incurs more delay that the corresponding mix columns 410 in the aes encrypt data path 400 due to additional Exclusive OR (XOR) gates. By separating the aes encrypt data path 400 and the aes decrypt data path 402, this additional delay is removed from the critical path of the aes encrypt data path 400.

The final round value is bypassed from the encrypt data path 400 and decrypt data path 402 before being registered in respective registers 422, 424 and prior to the mix-column transforms (mix columns 410 in the encrypt path, and inverse mix columns 422 in the decrypt data path). An Add round key (final) stage 420 is added for performing the add round key operation for the final aes round for encryption. An Add round key (final) stage 430 is added for performing the add round key operation for the final aes round for decryption. The additional add round key (final) stages 420, 430 are separated from the encrypt data path 400 and the decrypt data path 402. Thus, this results in a decrease in the critical path delay in the final aes encrypt round and the final aes decrypt round.

Furthermore, as the inverse mix columns 420 is not performed in the final aes decrypt round and the mix columns 410 is not performed in the final aes encrypt round, the additional delay due to multiplexer 426 is hidden in the non-critical final decrypt/encrypt aes round. The delay appears to be hidden because no additional delay is added to the aes encrypt path 400 and the delay added through add round key final 428 and multiplexer 426 is less than the delay through Mix Columns 410.

The encrypt/decrypt mode selects whether the encrypt value or the decrypt value is valid and the valid result is output through multiplexer 426. The reduction in the critical path delay due to the partitioning of the aes data path 103 into separate aes encrypt/decrypt data paths 400, 402 allows for a corresponding increase in the processor's clock frequency.

As discussed, an encryption and a decryption operation is performed on a 128-bit block state in parallel and the valid result (either the encrypt or decrypt result) of the operation is output. The flow through the aes encrypt data path 400 and the aes decrypt data path 402 for performing an encrypt/decrypt operation on a 128-bit block is described below.

When the fetch and decode unit 206 decodes an aes instruction, the original key and the data block (128-bits) to be encrypted that are stored in the register file 304 are forwarded to the aes encrypt path 400 and the aes decrypt path 402 in the aes data path 103 for processing. A multiplexer 432 selects whether the respective input to the block states 404, 414 is taken from the register file 304 or is an aes round key 436 from a previous aes encrypt round or aes decrypt round.

In block state 404, the 128-bit input (state) to the aes encrypt round is added with a round key (128-bit portion of the expanded key associated with the round) using bitwise XOR to produce a 128-bit intermediate value (state).

In Shift Rows 406, the 128-bit intermediate value (state) passes through a bit-linear transform in which bytes in each row of the 4×4 array (state) are shifted cyclically to the left. The number of places each byte is shifted differs for each row in the 4×4 array.

In S-box (SubBytes) 408, each byte of the result of Shift Rows is substituted with another byte value that can be stored and retrieved from a lookup table also referred to as a substitution box or "S-Box". The S-box takes some number of input bits, m, and transforms them into some number of output bits, n and is typically implemented as a lookup table. In one embodiment a fixed lookup table may be used. This operation provides non-linearity through the use of the inverse function over Galois Field (GF)($2^8$). For example, the n-bit output may be found by selecting a row in the lookup table using the outer two bits of the m-bit input, and selecting the column using the inner bits of the m-bit input.

In Mix Columns 410, the results from S-Box 408 passes through a bit-linear transform in which each column of the 4×4 array (state) is treated as a polynomial over a binary Galois Field (GF)($2^8$) and is then multiplied modulo $x^4+1$ with a fixed polynomial $c(x)=3x^3+x^2+x+2$.

An add round key 412 after Mix Columns 410 performs an exclusive OR function on the next aes round key 328 received from the on-the-fly scheduler 300 and the result of the aes round.

A last aes encrypt round differs from the other aes decrypt rounds in that it omits the Mix Columns stage 410.

In block state 414, the 128-bit input (state) to the aes decrypt round is added with a round key (128-bit portion of the expanded key associated with the round) using bitwise XOR to produce a 128-bit intermediate value (state).

In Inverse Shift Rows 418, the inverse operation to Shift Rows 406 is performed.

In the inverse S-box (SubBytes) 416, the inverse operation to S-box 408 is performed.

In Inverse Mix Columns 420, the inverse operation to Mix Columns 410 is performed.

An add round key 422 after the Inverse Mix Columns stage 420 performs an exclusive OR function on the encrypt/decrypt round key 328 from the on-the-fly-scheduler 300 and the result of the previous aes decrypt round operation.

A last aes decrypt round differs from the other aes decrypt rounds in that it omits the Inverse Mix Columns stage 420.

In an alternate embodiment, for example, in an x86 execution pipeline, as there is an existing micro operation for XOR, in order to save area, the final XOR may be performed as an additional micro-operation instead of adding the Add round key (final) stages 430, 420. However, this embodiment results in additional latency to AES operations.

Figure 5:
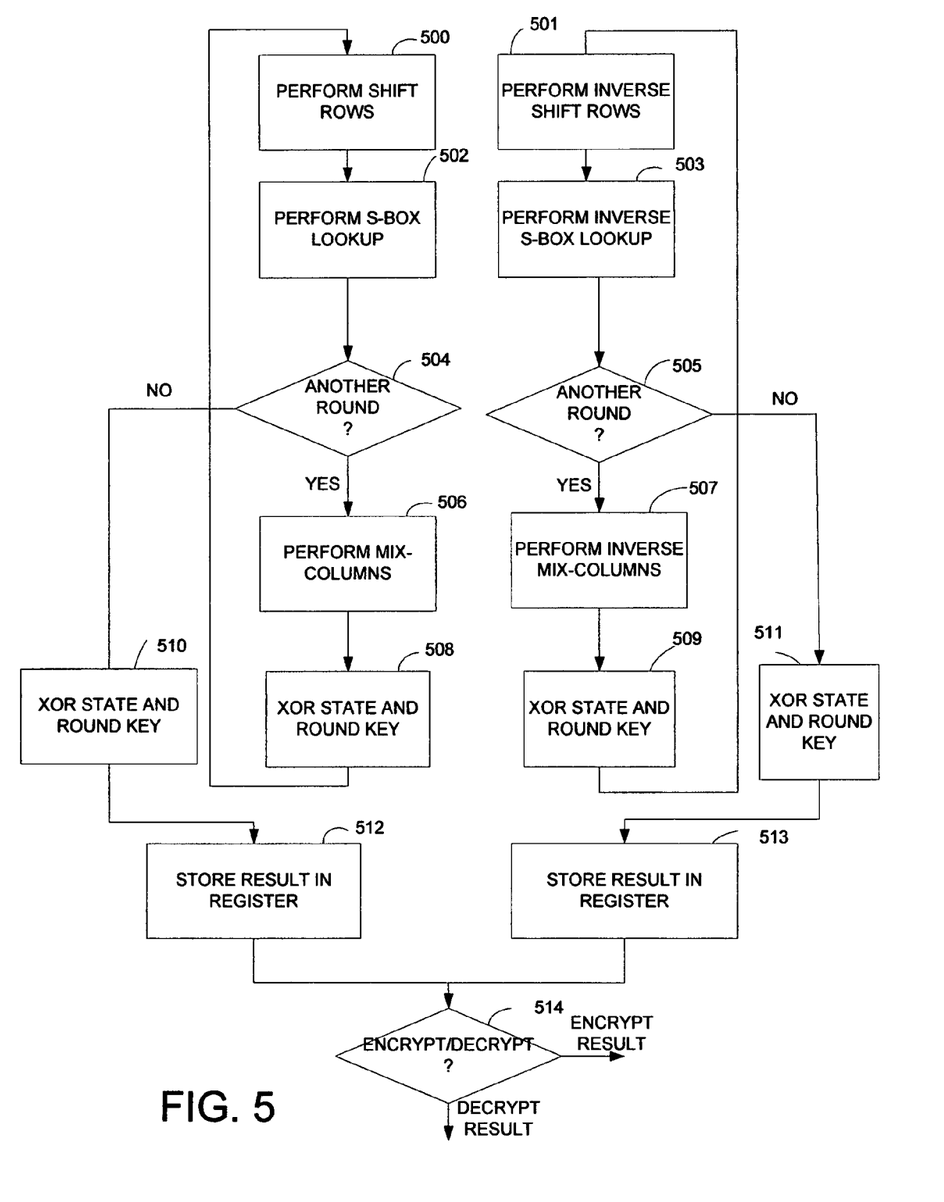
FIG. 5 is a flow graph illustrating the flow of an aes instruction through the aes data path in the execution unit shown in FIG. 4.

FIG. 5 is a flow graph illustrating the flow of an aes instruction through the aes data path 103 shown in FIG. 4. An encryption and a decryption operation is performed in parallel on a 128-bit block state and either the encrypt or decrypt result of the operation is output dependent on the state of the encrypt/decrypt mode.

At block 500, the 128-bit block state (4×4 array) passes through a bit-linear transform in which bytes in each row of the 4×4 array are shifted cyclically to the left. The number of places each byte is shifted differs for each row in the 4×4 array. Processing continues with block 502.

At block 501, an inverse shift rows operation for the decrypt operation is performed as defined by the Advanced Encryption Standard (AES), published by the National Institute of Standards and Technology (NIST) as Federal Information Processing Standard (FIPS) 197 which will be referred to as the AES standard. Processing continues with block 503.

At block 502, a substitution operation is performed on the 128-bit block state. Each byte of the 128-bit block state is substituted with another byte value that can be stored and retrieved from a lookup table also referred to as a substitution box or "S-Box". The S-box takes some number of input bits, m, and transforms them into some number of output bits, n and is typically implemented as a lookup table. The result is stored as a 128-bit block state. Processing continues with block 504.

At block 503, an inverse S-box lookup for the decrypt operation as defined by the AES standard is performed. Processing continues with block 505.

At block 504, a determination is made as to whether this is the last round or there are other rounds. If this is the last round, processing continues with block 510. If there are other rounds, processing continues with block 506.

At block 505, a determination is made as to whether this is the last round or there are other rounds. If this is the last round, processing continues with block 511. If there are other rounds, processing continues with block 507.

At block 506, the 128-bit block state (4×4 array) passes through passes through a bit-linear transform in which each column of the 4×4 array (state) is treated as a polynomial over GF($2^8$) and is then multiplied modulo $x^4+1$ with a fixed polynomial $c(x)=3x^3+x^2+x+2$. Processing continues with block 508.

At block 507, an inverse mix column operation is performed on the 128-bit block state as defined by the AES standard. Processing continues with block 509.

At block 508, the 128-bit block state input to the next round is added to the 128-bit schedule generated for the next round using bitwise XOR to produce a 128-bit block state. Processing continues with block 500 to process the next round for the 128-bit block state. Processing continues with block 500.

At block 509, the 128-bit block state input to the next round is added to the 128-bit schedule generated for the next round using bitwise XOR to produce a 128-bit block state. Processing continues with block 501.

At block 510, the 128-bit block state input to the last round is added to the 128-bit schedule generated for the last round using bitwise XOR to produce a 128-bit block state. Processing continues with block 512.

At block 511, the 128-bit block state input to the last round is added to the 128-bit schedule generated for the last round using bitwise XOR to produce a 128-bit block state. Processing continues with block 513.

At block 512, the result of the encrypt operation performed in the aes encrypt path is stored in a register. Processing continues with block 514.

At block 513, the result of the decrypt operation performed in the aes decrypt path is stored in a register. Processing continues with block 514.

At block 514, either the encrypt result from the aes encrypt path or the decrypt result from the decrypt path is returned as the result of the aes instruction.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
an aes encrypt data path to receive a data block and an encrypt round key for an aes encrypt round, the aes encrypt data path to perform a sequence of round operations on the received data block using the encrypt round key to provide a next encrypted data to a next aes encrypt round;
an aes decrypt data path to receive the data block and a decrypt round key for an aes decrypt round, the aes decrypt data path to perform a sequence of inverse round operations on the received data block using the decrypt round key in parallel with the aes encrypt data path to provide a next decrypted data to a next aes decrypt round, a first round operation performed on the received data block in the aes encrypt data path while an inverse first round operation is performed in parallel on the received data block in the aes decrypt data path, the aes encrypt data path and the aes decrypt data path are independent, the data block received in parallel by both the aes encrypt data path and the aes decrypt data path has a same value and one state is shared across the aes encrypt data path and the aes decrypt data path, the first round operation is shift rows;
a last aes encrypt round having fewer stages of micro-operations than previous aes encrypt rounds, the last aes encrypt round being separated from the aes encrypt data path and to receive a subbytes operation result for the last aes encrypt round and to perform an exclusive OR (XOR) operation on the subbytes operation result and the last encrypt round key to produce an encrypted result;
a last aes decrypt round having fewer stages of micro-operations than previous aes decrypt rounds, the last aes decrypt round being separated from the aes decrypt data path and to receive an inverse subbytes operation result for the last aes decrypt round and to perform an exclusive OR (XOR) operation on the inverse subbytes operation result and the last decrypt round key to produce a decrypted result; and
a selector with a selectable mode to select between outputting the encrypted result and the decrypted result.

2. The apparatus of claim 1, wherein the selectable mode is encrypt and the encrypted result is selected as a valid result.

3. The apparatus of claim 1, wherein the selectable mode is decrypt and the decrypted result is selected as a valid result.

4. The apparatus of claim 1, further comprising:
a first register to store the encrypted result; and
a second register to store the decrypted result.

5. The apparatus of claim 1, wherein the inverse first round operation is inverse shift rows.

6. A method comprising:
in an aes encrypt data path, performing a sequence of round operations on a received data block using an encrypt round key to provide a next encrypted data to a next aes encrypt round;
in an aes decrypt data path, performing a sequence of inverse round operations on the received data block using a decrypt round key to provide a next decrypted data to a next aes decrypt round, the sequence of inverse round operations to be performed in parallel with the sequence of round operations, a first round operation performed on the received data block in the aes encrypt data path while an inverse first round operation is performed in parallel on the received data block in the aes decrypt data path, the aes encrypt data path and the aes decrypt data path are independent, the data block received in parallel by both the aes encrypt data path and the aes decrypt data path has a same value and one state is shared across the aes encrypt data path and the aes decrypt data path, the first round operation is shift rows;
receiving a subbytes operation result for a last aes encrypt round having fewer stages of micro-operations than previous aes encrypt rounds, the last aes encrypt round separated from the aes encrypt data path;
performing an exclusive OR (XOR) operation on the subbytes operation result the last encrypt round key to produce the encrypted result;
receiving an inverse subbytes operation result for a last aes decrypt round having fewer stages of microoperations than previous aes decrypt rounds, the last aes decrypt round separated from the aes decrypt data path;
performing an exclusive OR (XOR) operation on the inverse subbytes operation result the last decrypt round key to produce the decrypted result; and
selecting between the encrypted result or the decrypted result as a valid result dependent on a selectable mode.

7. The method of claim 6, wherein the selectable mode is encrypt and the encrypted result is selected as a valid result.

8. The method of claim 6, wherein the selectable mode is decrypt and the decrypted result is selected as a valid result.

9. The method of claim 6, further comprising:
storing the encrypted result in a first register; and
storing the decrypted result in a second register.

10. The method of claim 6, wherein the inverse first round operation is inverse shift rows.

11. A system comprising:
a dynamic random access memory to store data and instructions; and
a processor coupled to said memory to execute the instructions, the processor comprising:
an execution unit to perform a sequence of operations for an aes instruction, the execution unit comprising an aes data path, the aes data path comprising:
an aes encrypt data path to receive a data block and an encrypt round key for an aes encrypt round, the aes encrypt data path to perform a sequence of round operations on the received data block using the encrypt round key to provide a next encrypted data to a next aes encrypt round;
an aes decrypt data path to receive the data block and a decrypt round key for the aes decrypt round, the aes decrypt data path to perform a sequence of inverse round operations on the received data block using the decrypt round key in parallel with the aes encrypt data path to provide a next decrypted data to a next aes decrypt round, a first round operation performed on the received data block in the aes encrypt data path while an inverse first round operation is performed in parallel on the received data block in the aes decrypt data path, the aes encrypt data path and the aes decrypt data path are independent, the data block received in parallel by both the aes encrypt data path and the aes decrypt data path has a same value and one state is shared across the aes encrypt data path and the aes decrypt data path, the first round operation is shift rows;
a last aes encrypt round having fewer stages of micro-operations than previous aes encrypt rounds, the last aes encrypt round being separated from the aes encrypt data path and to receive a subbytes operation result for the last encrypt round and to perform an exclusive OR (XOR) operation on the subbytes operation result and the last encrypt round key to produce an encrypted result;

a last aes decrypt round having fewer stages of micro-operations than previous aes decrypt rounds, the last aes decrypt round being separated from the aes decrypt data path and to receive an inverse subbytes operation result for the last decrypt round and to perform an exclusive OR (XOR) operation on the inverse subbytes operation result and the last decrypt round key to produce a decrypted result; and a selector to select between the encrypted result or the decrypted result dependent on a selectable mode.

12. An apparatus comprising:

an aes encrypt data path to receive a data block and encrypt the data block, the aes encrypt data path coupled to receive an encrypt round key for an aes encrypt round that includes performing a sequence of round operations on the data block using the encrypt round key;

an aes decrypt data path to receive the data block and decrypt the data block in parallel with the aes encrypt data path encrypting the data block, the aes decrypt data path coupled to receive a decrypt round key for an aes decrypt round that includes performing a sequence of inverse round operations on the data block using the decrypt round key, wherein a first inverse round operations is performed on the data block while a first round operations is performed on the data block in the aes encrypt data path, and wherein the data block has a same value and one state is shared across the aes encrypt data path and the aes decrypt data path;

a last aes encrypt round having fewer stages of micro-operations than previous aes encrypt rounds and being separated from the aes encrypt data path to receive a subbytes operation result for the last aes encrypt round and to perform an exclusive OR (XOR) operation on the subbytes operation result, the last aes encrypt round coupled to output a final encrypted data block generated in the last aes encrypt round;

a last aes decrypt round having fewer stages of micro-operations than previous aes decrypt rounds and being separated from the aes decrypt data path to receive an inverse subbytes operation result for a last decrypt round and to perform an exclusive OR (XOR) operation on the inverse subbytes operation result, the last aes decrypt round coupled to output a final decrypted data block generated in the last aes decrypt round; and selection logic coupled to receive the final encrypted data block and coupled to output the final encrypted data block when an input to the selection logic receives an encryption mode signal, and wherein the selection logic is coupled to receive the final decrypted data block and coupled to output the final decrypted data block when the input to the selection logic receives a decryption mode signal.

13. The apparatus of claim 12, wherein the data block is a 128 bit data block.

* * * * *